United States Patent
Reller et al.

(10) Patent No.: US 10,040,269 B2
(45) Date of Patent: Aug. 7, 2018

(54) METHOD AND APPARATUS FOR RETICULATING AN ADHESIVE TO THE SURFACE NETWORK OF A CELLULAR CORE STRUCTURE

(75) Inventors: Dan Reller, Arlington, TX (US); Paul Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 236 days.

(21) Appl. No.: 13/060,289

(22) PCT Filed: Sep. 5, 2008

(86) PCT No.: PCT/US2008/075336
§ 371 (c)(1),
(2), (4) Date: Feb. 23, 2011

(87) PCT Pub. No.: WO2010/027361
PCT Pub. Date: Mar. 11, 2010

(65) Prior Publication Data
US 2011/0151183 A1 Jun. 23, 2011

(51) Int. Cl.
*B32B 38/00* (2006.01)
*B32B 38/04* (2006.01)
(Continued)

(52) U.S. Cl.
CPC .................. *B32B 7/12* (2013.01); *B32B 3/12* (2013.01); *B32B 5/02* (2013.01); *B32B 5/147* (2013.01);
(Continued)

(58) Field of Classification Search
CPC .. B32B 3/24; B32B 7/12; B32B 37/12; B32B 37/14; B32B 38/04; C09J 7/0289
(Continued)

(56) References Cited

U.S. PATENT DOCUMENTS

| | | |
|---|---|---|
| 3,444,732 A | 5/1969 | Robbins |
| 3,656,992 A | 4/1972 | Lynam et al. |

(Continued)

FOREIGN PATENT DOCUMENTS

| | | |
|---|---|---|
| EP | 1577358 A1 | 9/2005 |
| EP | 1859922 A1 | 11/2007 |

(Continued)

OTHER PUBLICATIONS

Canadian Examination Report from the Canadian Intellectual Property Office in related Canadian Patent Application No. 2,736,165, dated Sep. 10, 2012, 2 pages.

(Continued)

*Primary Examiner* — Philip Tucker
*Assistant Examiner* — Christopher C Caillouet
(74) *Attorney, Agent, or Firm* — James E. Walton

(57) ABSTRACT

A present system of the present application provides for reticulating adhesive to the surface network of cellular core. As such, the present invention allows for substantial improvements over prior systems. The present invention may be implemented with any aircraft, wind turbine, rocket, space satellite, or land vehicle, but there is nothing within the spirit and scope of the present invention limiting it to any particular application. The teachings of the present invention are useful to any composite structure utilizing cellular core.

14 Claims, 4 Drawing Sheets

(51) Int. Cl.
| | |
|---|---|
| *C09J 7/26* | (2018.01) |
| *B32B 7/12* | (2006.01) |
| *B32B 5/02* | (2006.01) |
| *B32B 5/14* | (2006.01) |
| *B32B 5/24* | (2006.01) |
| *B32B 9/00* | (2006.01) |
| *B32B 9/04* | (2006.01) |
| *B32B 15/04* | (2006.01) |
| *B32B 15/20* | (2006.01) |
| *B32B 27/06* | (2006.01) |
| *B32B 27/16* | (2006.01) |
| *B32B 27/34* | (2006.01) |
| *B32B 3/12* | (2006.01) |

(52) U.S. Cl.
CPC ............... *B32B 5/24* (2013.01); *B32B 9/007* (2013.01); *B32B 9/04* (2013.01); *B32B 15/04* (2013.01); *B32B 15/20* (2013.01); *B32B 27/06* (2013.01); *B32B 27/16* (2013.01); *B32B 27/34* (2013.01); *C09J 7/26* (2018.01); *B32B 2262/101* (2013.01); *B32B 2307/102* (2013.01); *B32B 2307/50* (2013.01); *B32B 2307/718* (2013.01); *B32B 2405/00* (2013.01); *B32B 2603/00* (2013.01); *B32B 2605/00* (2013.01); *B32B 2605/18* (2013.01); *C09J 2201/20* (2013.01); *C09J 2201/36* (2013.01); *Y10T 156/1057* (2015.01); *Y10T 428/24298* (2015.01); *Y10T 428/24331* (2015.01)

(58) Field of Classification Search
USPC .................. 156/250, 252, 253, 256
See application file for complete search history.

(56) References Cited

U.S. PATENT DOCUMENTS

| | | | |
|---|---|---|---|
| 4,106,535 A | 8/1978 | Davis | |
| 4,249,974 A | 2/1981 | Wilson | |
| 4,676,942 A | 6/1987 | Ollivier et al. | |
| 4,948,445 A * | 8/1990 | Hees ................ | B29D 99/0089 156/196 |
| 5,084,345 A | 1/1992 | Manos | |
| 5,405,675 A | 4/1995 | Sawka et al. | |
| 5,804,030 A * | 9/1998 | Jaegers ............... | B31D 3/0292 156/510 |
| 5,938,875 A | 8/1999 | Jessup et al. | |
| 6,604,307 B1 | 8/2003 | Cahill et al. | |
| 7,338,696 B2 | 3/2008 | Rambaud et al. | |
| 2004/0023026 A1 | 2/2004 | Rambaud et al. | |
| 2004/0086686 A1* | 5/2004 | Holemans ............ | B29C 70/086 428/116 |
| 2004/0126537 A1* | 7/2004 | Jackson et al. ............... | 428/118 |
| 2004/0026034 A1 | 12/2004 | Colin | |
| 2006/0113698 A1 | 6/2006 | Curro et al. | |
| 2006/0172111 A1* | 8/2006 | Polus .................... | B29C 70/088 428/73 |

FOREIGN PATENT DOCUMENTS

| | | |
|---|---|---|
| GB | 2096535 A | 10/1982 |
| JP | 2000329295 A | 11/2000 |
| JP | 2005048084 A | 2/2005 |

OTHER PUBLICATIONS

International Preliminary Report on Patentability mailed by IPEA/USA, U.S. Patent and Trademark Office dated Jan. 13, 2012 for International Patent Application No. PCT/US08/75336, 7 pages.
International Search Report mailed by ISA/USA, U.S. Patent and Trademark Office dated Nov. 19, 2008 for International Patent Application No. PCT/US08/75336.
First Examination Report from Chinese Patent Office in related Chinese patent application No. 200880130992.2, 7 pages, dated Dec. 5, 2012.
Chinese Examination Report in related Chinese patent application No. 200880130992.2, 8 pages, dated Nov. 27, 2013.
Canadian Examination Report in related Canadian patent application No. 2,736,165, 2 pages, dated Aug. 12, 2013.
Chinese Examination Report in related Chinese patent application No. 200880130992.2, 8 pages, dated Jul. 3, 2013.
Extended Search Report dated May 26, 2014 from counterpart EP App. No. 08821374.9.
Canadian Examination Report in related Canadian patent application No. 2,736,165, 2 pages, dated Mar. 10, 2014.
Office Action dated Sep. 16, 2014 from counterpart CA App. No. 2,736,165.
European Office Action dated May 15, 2015 from counterpart EP App. No. 08821374.9.
Office Action dated Sep. 10, 2015 from counterpart EP App. No. 08821374.9.
Office Action dated Sep. 2, 2015 from counterpart CA App. No. 2,736,165.
Office Action dated Apr. 15, 2016 from counterpart EP App. No. 08821374.9.
EP Office Action dated Aug. 2, 2016 from counterpart EP App. No. 08821374.9-1308.
CN Office Action dated May 3, 2016 from counterpart CN App. No. 200880130992.2.
Chinese Office Action dated Jan. 22, 2017 from counterpart CN App. No. 200880130992,2, 5 pages.
Indian Office Action dated Feb. 15, 2017 from counterpart in App. No. 996/KOLNP/2011, 9 pages.
Indian Office Hearing Notice dated Aug. 30, 2017 from counterpart IN App. No. 996/KOLNP/2011, 2 pages.
Office Action dated Dec. 23, 2015 from counterpart EP App. No. 08821374.9.

* cited by examiner

METHOD AND APPARATUS FOR RETICULATING AN ADHESIVE TO THE SURFACE NETWORK OF A CELLULAR CORE STRUCTURE

TECHNICAL FIELD

The present application relates to composite structures.

DESCRIPTION OF THE PRIOR ART

Composite structures have been around for decades. There are many different types of composites, including some composites which utilize cellular core. Cellular core provides an efficient and lightweight means for strengthening composite structure. The term "cellular core" generally means a core material comprising a plurality of interconnected cell walls that define a plurality of cells. A typical composite structure utilizing cellular core consists of two face sheets adhesively bonded to each side of the cellular core. The cellular core is essentially sandwiched between the two face sheets. It is a goal to provide composite structure which is a lightweight as possible. Adhesive adds weight to the composite structure, but is vital in order to provide bond strength and structural integrity.

A number of methods have been developed in order to apply adhesive to the cellular core. One such method includes simply using a roller brush to apply the adhesive onto the surface network of the cellular core. However, even when this method is properly employed, it has significant drawbacks. One such drawback is that it is difficult to apply the adhesive with uniform thickness onto the surface network of the cellular core. However, possibly the most significant drawback is that this method must use an adhesive which is viscous at room temperature so that it can be it can be essentially painted onto the surface network of the cellular core. Adhesive which falls into this category does have sufficient bond strength characteristics for most composite structure applications. Therefore, such a process is generally not an option for most composite structure applications.

Another method of applying adhesive to cellular core is to simply apply a full sheet thermoset adhesive film onto the surface network of the cellular core. FIG. 1 is a cross-sectional view of an adhesive film 101 conventionally applied to a cellular core 103, having a surface network 105. Adhesive film 101 is applied to the surface network 105. A face sheet (not shown) can then be mated to the adhesive film 101 and cellular core 103. The structure is then cured at the requisite temperature and duration to form a permanent bond. The primary shortcoming of this conventional method is that a large amount of the adhesive adds no structural bond strength. Only the adhesive proximate to the surface network of the cellular core and the face sheet creates bonding strength. The adhesive located towards the center of the cell of the core does not benefit the bond strength in the composite structure. Consequently, the unbeneficial adhesive adds expense and weight to the composite structure.

Another method of applying adhesive to the cellular core is disclosed in U.S. Pat. No. 4,249,974, titled "Method for Reticulating an Adhesive to Conform to a Surface of an Apertured Workpiece," issued 10 Feb. 1981, to Wilson (Wilson). Wilson discloses a method of reticulating an adhesive film or sheet so that the adhesive exists only on the surface network of the cellular core prior to final bonding with a face sheet. FIGS. 2A-2D represent schematic cross-sectional views of the reticulating process according to Wilson. This method disclosed by Wilson involves essentially the following steps. First, a continuous film of adhesive material 201 is contacted upon the surface network of the cellular core 203. Next, the adhesive is heated 205 so that the cohesive strength is reduced. Then, the cells are subjected to pressurized gas 207 causing the heated adhesive to bubble until rupture 209. The intended result is for the surface tension of the adhesive to cause the adhesive to retract towards the surface network until a bead 211 of adhesive lies upon the surface network of the cellular core, as shown in FIG. 2D. While the method disclosed in Wilson represents a notable attempt to improve upon the conventional method, many shortcomings remain.

One such shortcoming with the traditional reticulating process is the amount of interrelated variables associated with the process, making the process complex and unreliable. It is difficult to obtain consistent and uniform bubble burst since the resulting bubble burst is a function of multiply variables, some of which include: air pressure, air temperature, air flow rate, core cell size, core cell depth, conveyor speed, overhead heat, and adhesive type. Consequently, the adhesive bubbles do not burst uniformly on a consistent basis, especially for larger core cell sizes. This results in asymmetrical adhesive thicknesses on the surface network of the cellular core. Another undesirable result is the tendency of the adhesive to pull off from the surface network and therefore never obtaining bubble burst. This resulting adhesive separation produces areas of the surface network having a deficient amount of adhesive and other areas having too much adhesive. Consequently, it is time consuming and costly to continuously experiment with the variables in order to obtain a cellular core with properly reticulated adhesive.

Another shortcoming is that this conventional reticulation method does not work well with open architecture cellular core. Open architecture cellular core is where the cell walls are porous. An example of an open architecture cellular core would be a triaxial core, leno style core, or core produced with a carbon graphite weave. Porous cell walls result in unpredictable air flow characteristics, which negatively affect bubble burst of the adhesive. Another problem is that this method does not work well with non planar cellular core geometry. Irregular cell depth induces a dynamic event during this traditional reticulation process that results in irregular bubble burst. Similarly, this method does not work well with cellular core consisting of multiple sized cells. Another shortcoming is that fact that the traditional reticulating process as disclosed in Wilson does not provide for the situation when one side of the cellular core is already bonded to a face sheet. Often it is desirable to have the cellular core already bonded to one face sheet before carving the other side of the cellular core to the desired contour. Having the cellular core bonded to a face sheet before carving the surface network of the opposite side, stabilizes the cellular core during the carving process. Also, having the cellular core bonded to a face sheet facilitates filling the cells with any substance which could function to improve certain desired characteristics of the composite structure. One example would be filling the cells with an acoustic absorbing gel in order to improve the acoustic dampening of the composite structure.

While there have been significant advancements in the field of applying adhesive to cellular core, vast room for improvement remains.

BRIEF DESCRIPTION OF THE DRAWINGS

The novel features believed characteristic of the system of the present application are set forth in the appended claims.

However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein.

Figure 1:
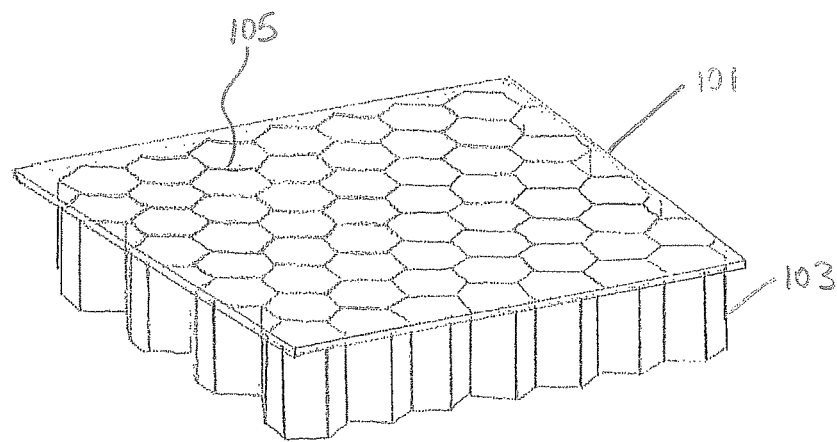
FIG. 1 is perspective view of a conventionally applied adhesive film on cellular core according to prior art.
Figure 2A:
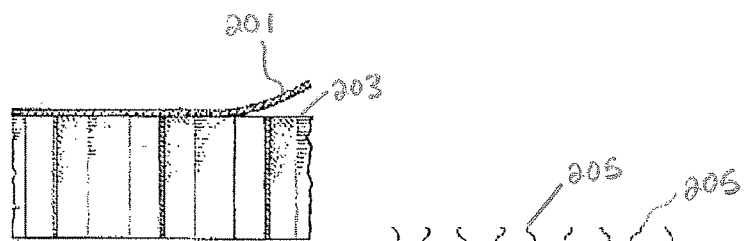
FIGS. 2A-2D are progressive cross-sectional views of reticulating adhesive to cellular core according to prior art.
Figure 2B:
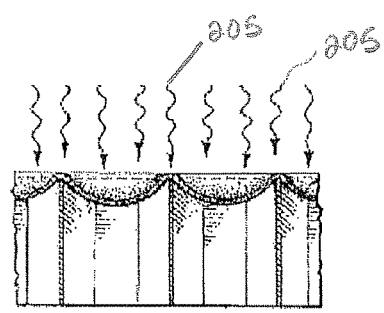
Figure 2C:
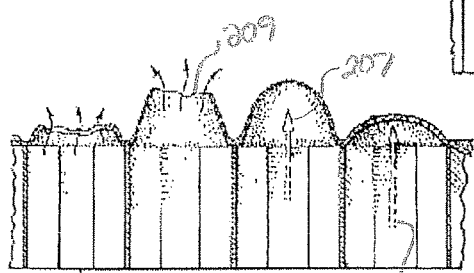
Figure 2D:
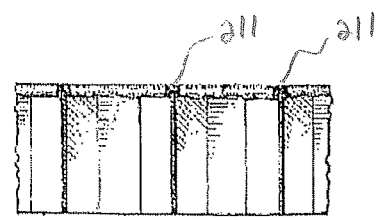

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the system of the present application as defined by the appended claims.

DESCRIPTION OF THE PREFERRED EMBODIMENT

The system of the present application allows for substantial improvements in the field of composite structures. The present application represents the discovery of an effective system to reticulate adhesive onto the surface network of cellular core. An example of the type of object able to make use of the system of the present application is rotorcraft structure, but there is nothing within the spirit and scope of the system of the present application limiting it to any particular function. For example, the system of the present application may be implemented with any aircraft, wind turbine, rocket, space satellite, or land vehicle. In addition, the teachings of the system of the present application are useful for any design utilizing cellular core in a composite structure.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3A:
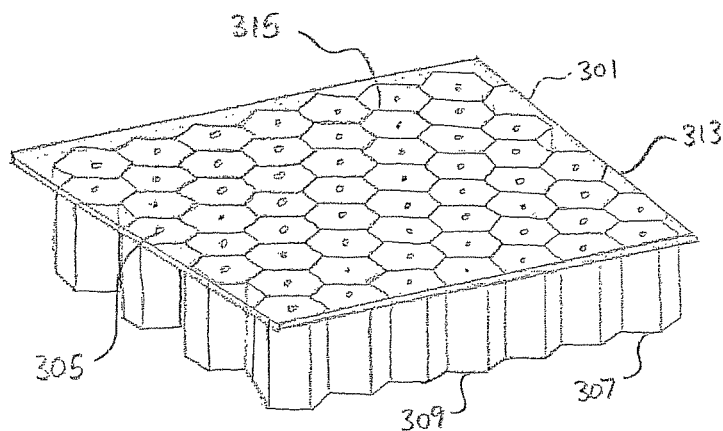
FIG. 3A is a perspective view of an adhesive film applied to cellular core according to the preferred embodiment of the system of the present application.

The system of the present application involves the application of thermosetting adhesive film to cellular core, and the execution of a reticulation process so as to concentrate the adhesive only proximate to the surface network of the cellular core. In general, the surface network of cellular core may be described as the surface formed by the end edges of the interconnected cell walls. It should be appreciated that for clarity, the adhesive in the figures below is depicted as transparent, but the actual adhesive may be of any level of transparency or color. Referring to FIG. 3A in the drawings, perforations 305 in an adhesive film 301 with a cellular core 307 are shown. Cellular core 307 comprises multiple individual cells 309. Adhesive film 301 is cut to the appropriate size so that adhesive film 301 may be laid upon a surface network 315 of cellular core 307.

In the preferred embodiment, perforations 305 are actual holes resulting from removal of selected portions of the adhesive material created in adhesive film 301. It should be understood that perforations 305 may also be the result of the adhesive material being displaced by means of a puncture, or the like. Perforations 305 may also be non-circular in shape, such as square, oblong, hexagonal, and the like. Perforations 305 may also represent a multitude of sizes. Generally, a large hole perforation 305 will result in less adhesive thickness after reticulation, than would a small hole perforation 305. Adhesive thickness after reticulation is explained further in the description of FIG. 5. Selectively adjusting the size of perforations 305 is one way the user can customize the desired final adhesive thickness. It should also be appreciated that perforations 305 can be of different sizes on a single article in order to customize the reticulated adhesive thickness within a single article. Perforations 305 are preferably produced by a perforating mechanism 303. Perforating mechanism 303 can be a variety of mechanisms. Examples of perforating mechanisms 303 include, but are not limited to, mechanical punches, hole saws, and high energy methods, such as ultrasonic or laser, as well as, hole cutters utilizing a vacuum. Perforations 305 can be made in adhesive film 301 either before or after adhesive film 301 is laid upon cellular core 307. Adhesive film 301 is discussed in more detail below.

Figure 3B:
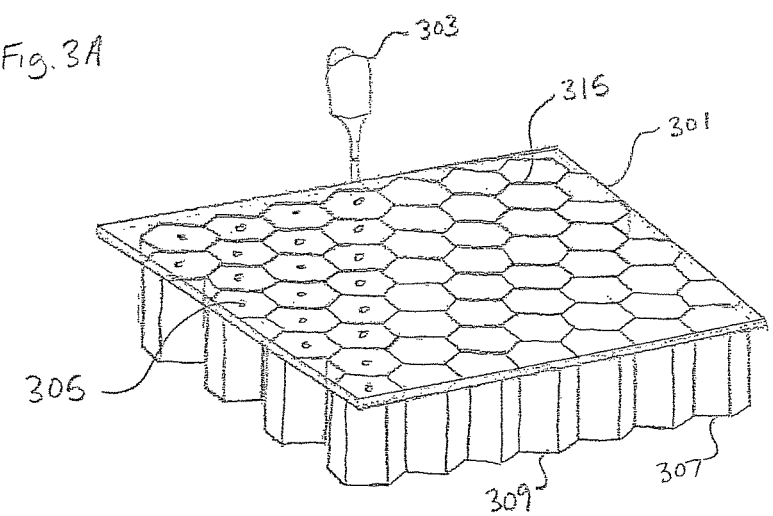
FIG. 3B is a perspective view of perforations being created in adhesive film after adhesive film has already been applied to cellular core according to the preferred embodiment of the system of the present application.

Referring now to FIG. 3B in the drawings, a perspective view of the preferred embodiment of the system of the present application is illustrated. In FIG. 3B, perforations 305 are shown being made after adhesive film 301 has been applied to surface network 315. In this embodiment, perforations 305 are made using perforating mechanism 303 at the approximate center of each individual cell 309.

Figure 3C:
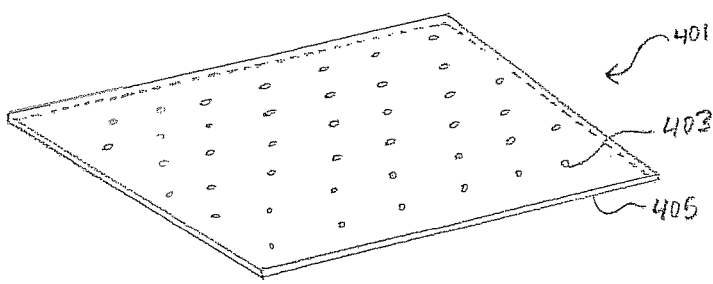
FIG. 3C is a perspective view of perforations being created in adhesive film according to the system of an alternative embodiment of the system of the present application.

Referring now to FIG. 3C in the drawings, a perspective view of an alternative embodiment illustrates a perforated adhesive film 401 where perforations 403 have been made in the adhesive film 405, prior to adhesive film 405 being applied to cellular core. Perforations 403 are located to coincide with the approximate center of individual cells of a cellular core.

In the preferred embodiment, adhesive film 301 is a thermoset adhesive system similar to the adhesive system sold by 3M under model No. AF-163, but could also be other adhesive systems, such as the model No. FM300 sold by Cytec. The 3M AF-163 is cured at approximately 250° F. and the Cytec FM300 cured at approximately 350° F. Generally thermoset adhesives with a higher cure temperature offer more bonding strength, but the viscous window for reticulating is narrower. However, both types of adhesive systems have proven to work well in the system of the present application. The thickness of adhesive film 301 is approximately 0.06 pounds per square foot, but could vary significantly according to specific requirements. Generally, thicknesses of thermoset adhesive systems are expressed in terms of pounds per square foot. Another technique of customizing final adhesive thickness is to use multiple sheets of adhesive film 301, each with a different thickness. The various sheets of adhesive film 301 can be applied on surface network 315 of cellular core 307. The customization of adhesive thickness is advantageous when a large amount of bond strength is desired on a portion of the composite core, but only a small amount of bond strength is desired on another portion of the cellular core. Adhesive film 301 is generally obtained in rolls having one or more protective layers, which are removed before application.

The system of the present application represents reticulating adhesive onto surface network 315 of cellular core 307. While many cellular core materials define hexagonal cells, also referred to as "honeycomb", the scope of the system of the present application encompasses core materials that define cells of other shapes, such as square, rectangular, circular, and the like. The size of individual cells 309 in cellular core 307 can also be many different sizes. Examples of such sizes include, but are not limited to, cell diameters of ⅛ inch, ½ inch, ⅝ inch, and 1 inch. The material of cellular core 307 can be many different compositions, depending on the desired characteristics. Examples of such materials include, but are not limited to, carbon, aramid, fiberglass, aluminum, titanium, phenolic, and graphite. For clarity, cellular core 307 shown in FIG. 3 is planar; however, non-planar or contoured cellular cores are also suitable for the system of the present application. Although it is preferred that cellular core 307 be untreated, it will be appreciated that in some embodiments cellular core 307 may be coated, treated, or otherwise modified so as to promote the attraction of adhesive to cellular core 307.

Figure 4:
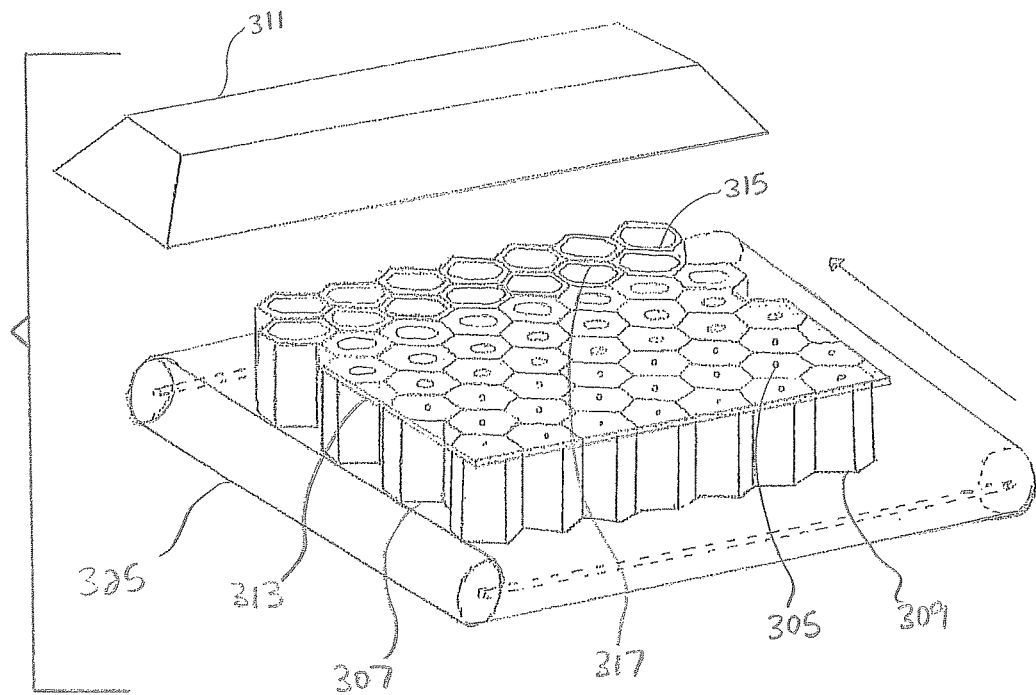
FIG. 4 is a perspective view of the reticulating process according to the system of the present application.

Referring now to FIG. 4 in the drawings, the process of perforating adhesive film 313 on cellular core 307, while moving on a conveyor 325, and being subjected to a heat source 311, is illustrated. As perforated adhesive film 313 comes within close proximity to heat source 311, perforated adhesive film 313 becomes viscous. Once perforated adhesive film 313 becomes viscous, the inherent surface tension of perforated adhesive film 313 causes perforated adhesive film 313 to withdraw toward surface network 315, thereby changing into reticulated adhesive 317. As reticulated adhesive 317 moves away from heat source 311, reticulated adhesive 317 cools and becomes less viscous. Fully reticulated adhesive 317 is discussed in more detail below.

In the preferred embodiment, heat source 311 is a 1500 Watt heat lamp; however, it should be understood that the power and type of heat source 311 may be selectively chosen depending upon the materials used and the results desired. The distance of perforated adhesive film 313 to heat source 311 is approximate 4.6 inches; however, this distance may be selectively chosen depending upon the materials used and the results desired. Conveyor 325 moves cellular core 307 at a rate of approximately ½ inch per second; however, it will be appreciated that this feed rate may be selectively chosen depending upon the materials used and the results desired. It will be appreciated that the feed rate need not be constant. Conveyor 325 may be any mechanism that moves cellular core 307 under heat source 311. Alternatively, heat source 311 may move relative to stationary cellular core 307.

Figure 5:
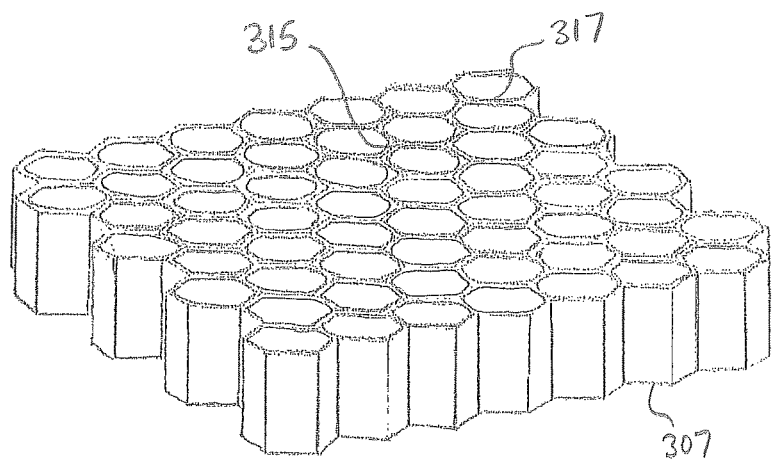
FIG. 5 is a perspective view of reticulated adhesive on cellular core according to the system of the present application.

In continuation of the process, a perspective view of cellular core 307 with fully reticulated adhesive 317 is illustrated in FIG. 5 of the drawings. Reticulated adhesive 317 represents a continuous bead of adhesive proximate to surface network 315 of cellular core 307. In general, the thickness of fully reticulated adhesive 317 is simply the amount of adhesive located proximate to the surface network 315 of cellular core 307. A face sheet can now be mated to cellular core 307, or the process can be repeated in order to reticulate adhesive onto surface network 315 of the opposite side of cellular core 307.

Figure 6:
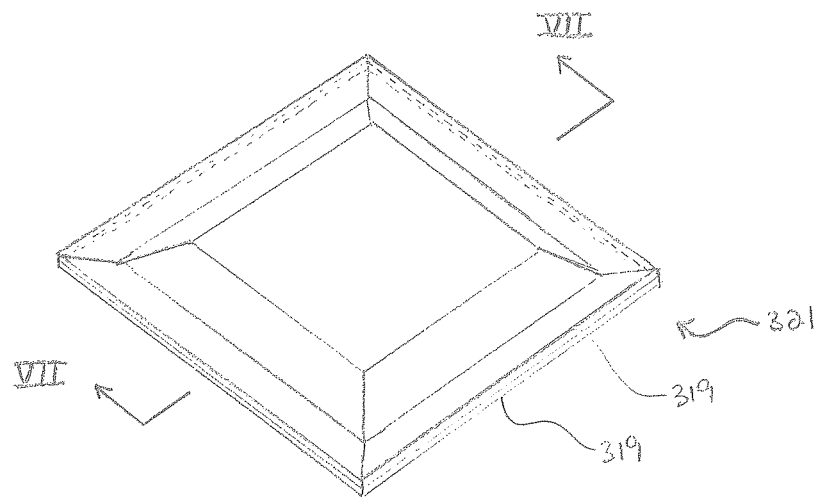
FIG. 6 is a perspective view of a composite structure according to the system of the present application.
Figure 7:
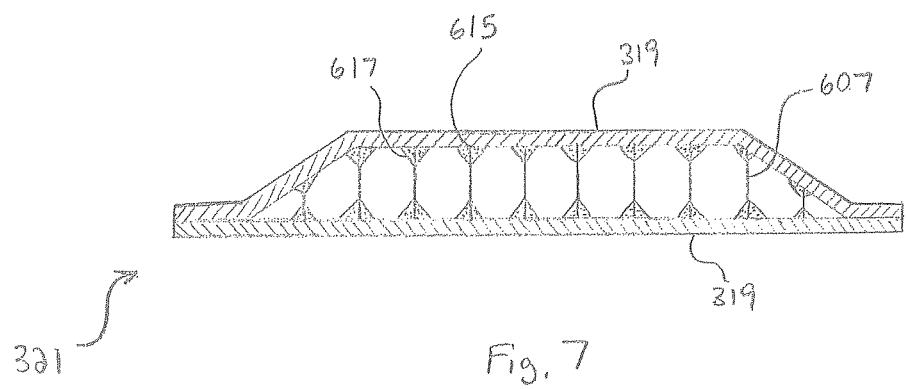
FIG. 7 is a cross-sectional view of a composite structure according to the system of the present application, taken at VII-VII in FIG. 6.

Referring now to FIGS. 6 and 7 in the drawings, FIG. 6 is a perspective view of a composite structure 321, and FIG. 7 is a cross-sectional view taken at VII-VII in FIG. 6. Composite structure 321 consists of a face sheet 319 bonded onto each side of a cellular core 607 having a surface network 615. The mating of face sheet 319 to the surface network 615 of cellular core 607 forces most of reticulated adhesive 617 to be concentrated adjacent to surface network 615 of cellular core 607 and the inside surface of face sheet 319. Before mating face sheet 319 to cellular core 607, generally most of reticulated adhesive 617 is located on top of surface network 615. A bond between cellular core 607 and face sheet 319 is formed by curing reticulated adhesive 617 at a selected temperature and duration. In general, the amount of bond strength between face sheet 319 and cellular core 607 is proportional to the amount of reticulated adhesive 617 adjacent to surface network 615 and the inside surface of face sheet 319.

The system of the present application provides significant advantages over systems of the past, including: (1) producing a lighter weight structure as compared to using adhesive film without reticulation; (2) the ability to consistently and efficiently obtain properly reticulated adhesive; (3) the ability to reticulate adhesive on open architecture cellular core, contoured or non-planar cellular core, as well as cellular core consisting of multiple cell sizes; and (4) the ability to reticulate adhesive onto the surface network of cellular core which already has a face sheet permanently bonded to the opposite side.

The particular embodiments disclosed above are illustrative only, as the system of the present application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the system of the present application.

Accordingly, the protection sought herein is as set forth in the claims below. It is apparent that a system of the present application with significant advantages has been described and illustrated. Although the present system of the present application is shown in a limited number of forms, it is not limited to just these forms, but is amenable to various changes and modifications without departing from the spirit thereof.

The invention claimed is:

1. A method for applying adhesive onto a surface network of a cellular core, comprising:
    obtaining an adhesive film having multiple sheets of adhesive, each with a different thickness;
    applying the adhesive film onto the surface network of the cellular core;
    selectively varying a bond strength across the cellular core by regulating the thickness of the adhesive film along a length of the cellular core, the cellular core comprising a plurality of hexagonal cells;
    varying the adhesive film thickness onto the surface network of the cellular core along the length of the cellular core, the thickness of the adhesive film having a greater thickness at a first end of the length of the cellular core than a thickness at a second opposing end of the length of the cellular core;
    perforating the adhesive film while on the surface network by removing a plurality of selected portions of the adhesive film so as to make a plurality holes in the adhesive film that are shaped complementary to the hexagonal cells, such that a location of each hole corresponds with an approximate center of each individual cell;
    perforating the adhesive film with a plurality of different sized perforations as the surface network of cellular core moves along a conveyor and as the thickness of the adhesive film changes from the first end of the length of the cellular core to the second end of the length of the cellular core;
    applying heat to the perforated adhesive film, such that the perforated adhesive film becomes viscous and retracts to the surface network of the cellular core; and
    cooling the perforated adhesive film after the perforated adhesive retracts to the surface network of the cellular core such that the perforated adhesive film becomes less viscous and remains in place;
    wherein the plurality of different sized perforations vary in diameter along the length of the cellular core.

2. The method according to claim 1, wherein the perforating the adhesive film is achieved by a mechanical means.

3. The method according to claim 1, wherein the perforating the adhesive film is achieved by a laser.

4. The method according to claim 1, wherein the perforating the adhesive film is achieved by a vacuum.

5. The method according to claim 1, wherein the cellular core has been carved.

6. The method according to claim 1, wherein the cellular core has been coated.

7. The method according to claim 1, wherein the cellular core has been treated.

8. The method according to claim 1, wherein the cellular core has reticulated adhesive on an opposing surface network.

9. The method according to claim 1, further comprising:
    placing a face sheet to an opposing surface network.

10. The method of claim 1, wherein the plurality of holes comprise a hexagonal shape.

11. An adhesive film for a cellular core, comprising:
    an adhesive film formed from a plurality of adhesive sheets, each with a different thickness;
    a plurality of perforations in the adhesive film located to coincide with the approximate center of each individual hexagonal cell of the cellular core, wherein the perforations are shaped complementary to the associated hexagonal cells;
    varying the adhesive film thickness onto the surface network of the cellular core along a length of the cellular core, the thickness of the adhesive film having a greater thickness at a first end of the length of the cellular core than a thickness at a second opposing end of the length of the cellular core; and
    perforating the adhesive film with a plurality of different sized perforations as the surface network of cellular core moves along a conveyor and as the thickness of the adhesive film changes from the first end of the length of the cellular core to the second end of the length of the cellular core;
    varying adhesive film thickness by varying the size of the plurality of different sized perforations;
    wherein the plurality of different sized perforations vary in diameter along the length of the cellular core; and
    wherein each perforation is the result of a portion of the adhesive film being removed while the adhesive film is in contact with the cellular core, the cellular core being non-planar.

12. An adhesive film according to claim 11, wherein the adhesive film is in a roll.

13. An adhesive film according to claim 11, wherein the adhesive film has one or more protective layers.

14. The adhesive film of claim 11, wherein the perforations comprise a hexagonal shape.

* * * * *